United States Patent [19]

Davis

[11] 4,204,749
[45] May 27, 1980

[54] EYEGLASS FRAME WITH TEMPLE ADJUSTING BRACES

[76] Inventor: John A. Davis, 231 Junipero Ave., Apt. 12, Long Beach, Calif. 90803

[21] Appl. No.: 5,827

[22] Filed: Jan. 23, 1979

[51] Int. Cl.² ............................................. G02C 5/14
[52] U.S. Cl. ..................................... 351/123; 351/41
[58] Field of Search ................. 351/123, 41, 158, 113, 351/121, 111, 118; 2/14; D15/34; 29/278; 128/410

[56] References Cited

U.S. PATENT DOCUMENTS

| | | | |
|---|---|---|---|
| 3,006,247 | 10/1961 | Davis | 351/123 |
| 3,620,219 | 11/1971 | Barker | 128/410 |
| 3,713,731 | 1/1973 | Gardner | 351/113 |
| 3,832,043 | 8/1974 | Usdan | 351/123 |
| 4,105,305 | 8/1978 | Lazarus | 351/123 |

FOREIGN PATENT DOCUMENTS 21755  1/1901  New Zealand ............................ 351/41

Primary Examiner—John K. Corbin
Assistant Examiner—B. W. de los Reyes
Attorney, Agent, or Firm—Fulwider, Patton, Rieber, Lee & Utecht

[57] ABSTRACT

An eyeglass frame is provided with braces that extend downwardly and rearwardly from the top of eyeglass lens holders to pass outboard adjacent and at an angle to rearwardly extending eyeglass temples. Adjustable biasing means are provided in the braces so that the temples can be biased inwardly toward each other against the head of a wearer to a selected degree. The braces apply an inward bias well to the rear of the temple hinges.

5 Claims, 5 Drawing Figures

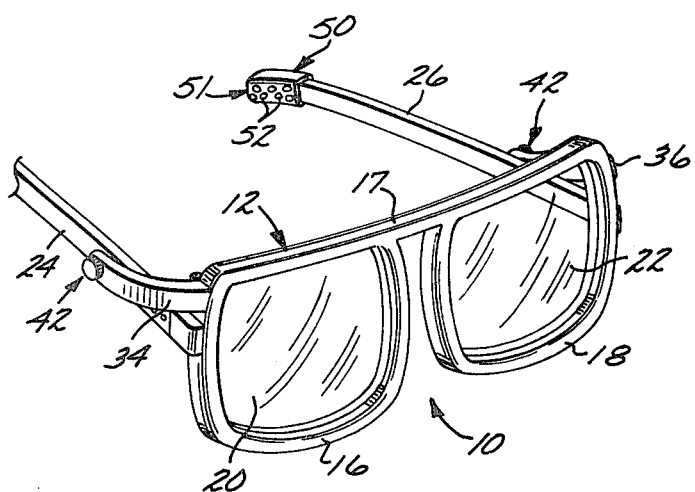
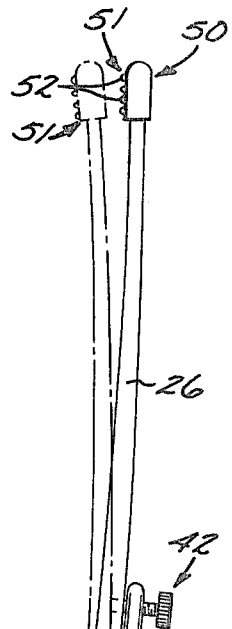
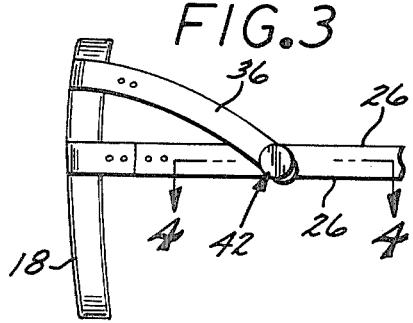
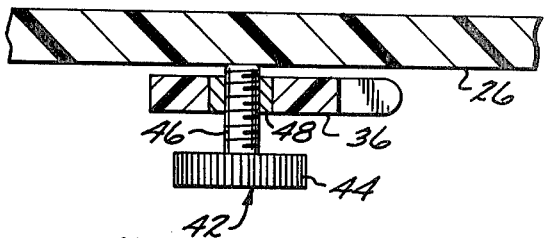
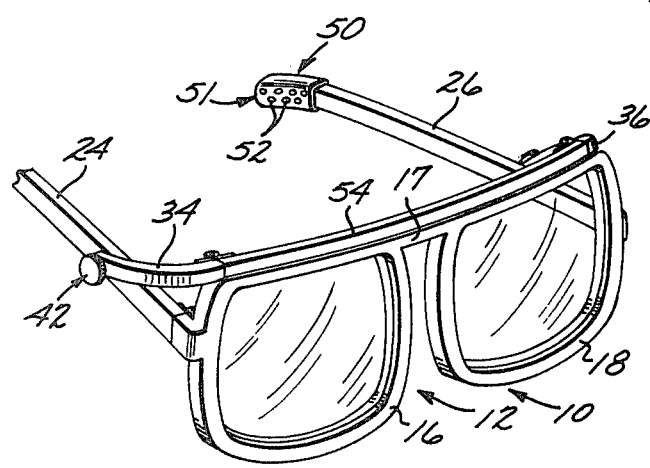

EYEGLASS FRAME WITH TEMPLE ADJUSTING BRACES

BACKGROUND OF THE INVENTION

1. Field of the Invention

The present invention is related to devices for adjusting the pressure of eyeglass temples against the head of a wearer to properly secure eyeglasses in position.

2. Description of the Prior Art

In the past, various types of spectacle frame adjusting devices have been constructed to vary the degree to which eyeglass temples press against the head of a wearer. The purpose of such devices is to prevent eyeglasses from sliding forward with the spectacle bridge working its way down the nose of the wearer. When this happens the wearer must push the spectacles back up into position every few minutes. This movement of the spectacles is both irritating and harmful to the wearer's eyesight, since the lens focus is altered when the eyeglasses slide forward. Prior temple bias adjusting devices have proven ineffective because the benefits of adjustable inward biasing of the bows have been nullified by the flexible nature of the eyeglass frames, or because prior devices have been overly complex and commercially unfeasible. As an example, U.S. Pat. No. 2,756,632 discloses a device in which a screw is directed angularly inward within each temple of an eyeglass frame to bear angularly against a surface in the frontal piece of the frame. However, the inward bias of the eyeglass bows from the pressure of the adjusting screw against an angular surface is distorted because of the play in the temple hinges and due to the deformation and slippage of the interacting bearing surfaces. Biasing the bows or temples of eyeglasses inward by virtue of pressure applied against a bearing surface at an angle considerably less than 90 degrees produces an inconsistent, pressure of the temples against the wearers head even after only very short periods of use. An alternative structure, with the same deficiencies, is depicted in U.S. Pat. No. 3,874,775.

In general, conventional temple biasing mechanisms fail to provide the necessary degree of bias and rigidity because they act through far too short a lever arm. The forces induced on the wearers head are not uniform and change continuously even without adjustment while being worn. Because of the short lever arm of the application of the biasing force, any nonuniformities in temple alignment, wear, bending of the hinges and other minor variations are magnified greatly.

SUMMARY OF THE INVENTION

In contrast to prior devices, the present invention applies an inwardly biasing force upon the eyeglass temples to aid in gripping the head of the wearer at locations well to the rear of the temple hinges. Hence, minor variations that influence the pressure applied to the head of the wearer by the eyeglass temples are not disproportionately magnified. Instead, the force applied to cause the temples to grip the head of the wearer remains remarkably uniform despite inelastic indentations in the interacting materials due to wear, temperature changes, and other occurrences that defeat the effectiveness of conventional aids used to enhance the grip of eyeglass temples.

The adjustment mechanism of the present invention which applies the inward biasing force against the temples may be in the form of a thumbscrew, a slotted screw or a screw having a polygonal head for manipulation with a wrench. Any form of the adjusting device may be manipulated by the wearer while the eyeglasses are in position without the trial and error techniques which are required with adjusting devices which can be altered only when the eyeglasses are removed from the wearers head. The wearer can adjust the mechanisms of the present invention without the assistance of an optician while the eyeglasses are in position on the wearer's head, so that the correct force can be achieved precisely. This prevents the irritation that results if too little pressure is applied and the headaches that occur if the pressure is too great.

A further significant feature of the invention is the application of a temple biasing force normal to the temple and a considerable distance to the rear of the temple hinges. Conventional eyeglass frame temple biasing devices are unable to shorten the lever arm of force application in this manner, and hence are unable to reduce the deliterous effects of minor positioning and deformation variations of the eyeglass frames upon the head of a wearer.

A further feature of the invention is that it may be applied to any eyeglass frame lens holding pieces. In many conventional spectacles, the eyeglass temples are joined to the lens holding pieces proximate the vertical center of the lens holders at the outside extremities thereof. There is thus room above the temple hinges to join the braces directly to the lens holders in spaced relationship from the temple hinges. In other types of eyeglass construction, the eyeglass temples may be joined to the lens holders more toward the upper portion thereof. However, and in accordance with the present invention, a rigid mounting bar may be constructed to extend across the top of the frontal lens support and to carry the hinges for mounting the braces at its outside extremities. This mounting bar also serves to rigidify the eyeglass frame structure. Thus, glasses of all types may be modified in accordance with the teachings of the present invention to provide a bias to the temples of the wearer to aid in causing eyeglasses to grip the head of the wearer firmly without significant alternation to the structure of the lens holders.

Moreover, the present invention is aesthetically pleasing as well as structurally sound. Because the side braces which carry the means for adjustably biasing the eyeglass temples inwardly are mounted atop the lens holders, and because the temples are hingedly mounted therebelow in spaced relationship therefrom, smoothly, rearwardly converging lines are defined to enhance the attractiveness of eyeglasses with which they are used.

The various advantages and features of the present invention are more clearly depicted and illustrated in the accompanying drawings.

DESCRIPTION OF THE DRAWINGS

FIG. 1 is a perspective view of a conventional eyeglass frame modified according to the present invention.

FIG. 2 is a top view of a portion of the eyeglass frame of FIG. 1.

FIG. 3 is a side elevational view of a section of the eyeglass frame of FIG. 1.

FIG. 4 is a detail view taken along the lines 4—4 of FIG. 3.

FIG. 5 illustrates an alternative embodiment of the invention utilizing a mounting bar.

DESCRIPTION OF THE EMBODIMENT

With reference to FIG. 1, spectacles 10 are depicted having a frontal lens support 12 defined by a pair of lens holders 16 and 18 joined together at a central bridge 17. A pair of elongated rearwardly directed temples 24 and 26 are attached to the lens holders 16 and 18 remote from each other by hinges 28. Opposing braces 34 and 36 are joined to the upper and outer corners of the lens holders 16 and 18 by brace hinges 38. The braces 34 and 36 meet the temples 24 and 26 at locations spaced well rearwardly from the temple hinges 28 when the temples 24 and 26 are extended. At the cantilevered ends of the braces 34 and 36, there are inwardly directed adjustable biasing thumbscrews 42. The thumbscrews 42 may be manually adjusted to vary the position of the temples 24 and 26, as illustrated in FIG. 2.

The lens holders 16 and 18 may be of any conventional configuration, but in the embodiment depicted in FIG. 1 include plastic rims encircling glass lenses 20 and 22 completely. The plastic rims are joined at their upper and inner corners by the bridge 17.

The temple hinges 28 are leaf type hinges, each including an angle section 30 having one leg mounted in face to face relationship with the inside surface of one of the outer edges of the lens holders 16 and 18, as depicted in FIG. 2. The other angle leg extends rearwardly and terminates in a hinge knuckle. The other leaf 32 of each of the temple hinges 30 includes a knuckled joint that interlocks with the corresponding knuckle in the angle section 30. A small screw passes downwardly through each of the knuckles and resides in threaded engagement with the lowermost knuckle portion in the leaf 32. The hinges 28 are fastened in position by rivets.

The brace hinges 38 are of a common double leaf hinge construction. The braces 34 and 36 are fastened to the lens holders 16 and 18 at the upper outside corners thereof by the brace hinges 38 and extend either linearly or arcuately, as depicted in FIG. 3, at an angle downwardly and rearwardly to pass outboard adjacent to the corresponding temples 24 and 26. The hinges 38 are attached by rivets to the lens support 12 and the temples 24 and 26. From the drawings, and especially FIG. 2, it should be noted that the brace hinges 38 are limited in their outward folding movement relative to the lens holders 16 and 18. When the spectacles 10 are mounted in position upon the head of a user, and the temples 24 and 26 are biased inwardly against the users head, the braces 34 and 36 and the frontal lens support 12 form a rigid structure.

As depicted in FIG. 4, the thumbscrews 42 are equipped with a knurled head 44 and a threaded shank 46 directed inwardly to bear against the corresponding eyeglass temple 24 or 26 normal thereto. The thumbscrews 42 are threadably engaged in interiorally threaded annular bushings 48 which are firmly embedded in the braces 34 and 36. The shanks 46 of the thumbscrews 42 act normal to the temples to bias them inwardly toward the head of a wearer to a selected disposition, as indicated by the alternative positions depicted in FIG. 2.

As is apparent in FIGS. 1 and 3, the location of the attachment of the braces 34 and 36 to the lens holders 16 and 18 is in vertical displacement from the locations of attachment of the temples 24 and 26 at the temple hinges 28. This vertical displacement in the connections to the lens holders 16 and 18 allows the braces 34 and 36 to be mounted without interfering with the folding action of the temples 24 and 26. The downwardly angled inclination of the braces 34 and 36 allows the cantilevered ends thereof to pass adjacent the associated temple a significant distance to the rear of the temple hinges 28, preferably at a separation therefrom of at least one and half inches. The shanks 46 of the thumbscrews 42 therefore act upon the temples 24 and 26 to bias them inwardly while acting through a much greater lever arm than has been achieved with prior art devices.

Because the long fixed lever arm from the hinges 28 to the points of contact of the thumbscrews 42 through which the force is exerted is such a dominant characteristic of the moment applied to the rearward extremities of the temples 24 and 26, minor variations in the biasing force are not magnified as with conventional devices. Such minor variations occur by virtue of wear of the shanks 46 against the temples 24 and 26, temperature changes which alter the length of the exposed portions of the shanks 46 between the braces and the adjacent temples, and play or tolerance in the hinges 28 and 38. The further the thumbscrew 42 is located from the hinge 30, the more the detrimental effects of these minor variations are minimized.

As is apparent in FIGS. 1 and 2, the cantilevered tips of the temples 24 and 26 remote from the lens holders 16 and 18 are equipped with soft rubber jackets 50 having inwardly directed surfaces 51 with a frictionally gripping tread directed therefrom. In the embodiments depicted, this tread is formed by a plurality of inwardly directed protruberances 52 which contact and assist in gripping the skin adjacent the bone structure of the head above and behind the ears of the wearer. The tread formed by the protruberances 52 thereby forms a friction pad about ¾ inches long that, combined with the biasing force applied by the thumbscrews 42 upon the temples 24 and 26, tends to totally immobilize the spectacles 10 upon the head of the wearer.

As hereinbefore noted, the brace hinges 38 are located in vertical displacement from the temple hinges 28. In the embodiment of FIG. 1, the brace hinges 38 are fixed directly to the lens holders 16 and 18. In some eyeglass configurations, however, this is impractical. Accordingly, and pursuant to the teachings of the present invention, a mounting bar 54, about ⅛ inch square in cross section of stainless steel may be firmly attached to the lens holders 16 and 18 to extend across the top of the lens support 12. An embodiment of this construction is depicted in FIG. 5. The mounting bar 54 may be reinforced or encased in metal or plastic and attached to the lens holders 16 and 18 by tiny gusset plates fastened with rivets to the members to be joined. The mounting bar 54 is thus totally immbolized with and becomes a part of the frontal lens support 12, as depicted in FIG. 5. The mounting bar 54 and the braces 34 and 36 terminate in abutting ends which cooperate to form a means for limiting outward movement of the braces 34 and 36 relative to the lens holder 12. When the coacting ends of the braces 34 and 36 and the mounting bar 54 are brought into abutment with each other, a rigid structure is formed to which the thumbscrews 42 are anchored.

To utilize either the embodiment of FIGS. 1-4 or the embodiment of FIG. 5 of the invention, the wearer need merely place the spectacles 10 upon his or her head in the normal position in which they are to be worn with the bridge 17 seated on the wearer's nose and with the temples 24 and 26 passing rearwardly atop the wearer's ears with the cantilevered ends bearing against the wearer's head where the skull is closed behind the skin surface. The treaded pads 51 formed by the protruberances 52 aid in gripping the wearer's head and the wearer need merely adjust the pressure of the these pads by rotating the thumbscrews 42 clockwise or counterclockwise. Clockwise rotation increases pressure while counterclockwise rotation relieves the force with which the temple pads 51 bear against the wearer's head. Once adjusted properly, the spectacles 10 will remain in position high atop the wearer's nose dispite vigorous movements of the wearer's head.

The spectacles 10 may be removed and the temples 24 and 26 folded inwardly in a conventional fashion. Likewise, the downwardly angled braces 34 and 36 also fold inwardly upon the hinges 38 to allow the spectacles 10 to be inserted into a conventional eyeglass case. When again unfolded, the adjustment of the thumbscrews 42 remains unaltered and the eyeglasses can be repositioned on the wearer's head with the pads 51 exerting almost the identical pressure as before. Because the braces 34 and 36 pass outboard of the temple 24 and 26, unfolding the temples 24 and 26 automatically brings the braces 34 and 36 into position. To fold the spectacles 10, the braces 34 and 36 must be pressed directly to achieve inward folding, although this can be performed with the same hand movements to fold the temples 24 and 26 in the embodiments depicted. It is possible for the end of the shank 42 to be permanently entrapped by the corresponding temple 24 or 26, in which case the braces will always fold and unfold with their associated temples.

The structure of the particular embodiments of the invention depicted in the drawings should not be construed as limiting to the scope of the invention. Rather, the scope of the invention is defined in the claims appended hereto.

I claim:

1. An eyeglass frame having
   a frontal lens support with a pair of lens holders joined by a central bridge,
   foldable temples extendable rearwardly from both of said lens holders and terminating in tips remote from said lens holders
   pads located on said temple tips and having inwardly directed surfaces that enhance friction against the head of a wearer,
   temple hinges joining said temples to said lens holders,
   bracing fastened to each of said lens holders above the level of said temple hinges and extending at an angle downwardly and rearwardly to pass outboard adjacent to said temples at locations spaced rearwardly from said temple hinges at a separation therefrom of at least one and one half inches when said temples are extended,
   foldable brace hinges fastening said braces to said lens holders with means for limiting outward movement of said braces relative to said lens holders, and
   adjustable biasing means mounted on each of said braces where they pass adjacent said temples including a threaded bushing mounted in said brace and an outwardly disposed thumbscrew engaged therein to act normal to an adjacent temple to bias said temple inwardly to a selected disposition to an adjustable degree.

2. An eyeglass frame according to claim 1 further characterized in that said pads are formed of soft rubber jackets and said inwardly directed surfaces have a frictionally gripping tread directed therefrom.

3. An eyeglass frame according to claim 1 further comprising a mounting bar extending across the top of said frontal lens support and attached thereto and carrying said brace hinges at the outer extremities thereof.

4. An eyeglass frame according to claim 3 further characterized in that said mounting bar and said braces terminate in abutting ends which co-operate to form said means for limiting outward movement of said braces relative to said lens holders.

5. An eyeglass frame according to claim 1 further characterized in that said temple hinges are mounted on said frontal lens support proximate to the vertical center thereof and said temple hinges are vertically spaced therefrom.

* * * * *